(12) United States Patent
Sun et al.

(10) Patent No.: US 8,804,829 B2
(45) Date of Patent: Aug. 12, 2014

(54) OFFLINE MOTION DESCRIPTION FOR VIDEO GENERATION

(75) Inventors: Xiaoyan Sun, Beijing (CN); Feng Wu, Beijing (CN); Shipeng Li, Redmond, WA (US); Wang Yi, Hefei (CN)

(73) Assignee: Microsoft Corporation, Redmond, WA (US)

( * ) Notice: Subject to any disclaimer, the term of this patent is extended or adjusted under 35 U.S.C. 154(b) by 1464 days.

(21) Appl. No.: 11/613,972

(22) Filed: Dec. 20, 2006

(65) Prior Publication Data
US 2008/0152008 A1 Jun. 26, 2008

(51) Int. Cl.
*H04N 11/04* (2006.01)
(52) U.S. Cl.
USPC ................................... 375/240.16
(58) Field of Classification Search
USPC .......... 375/240; 382/100, 181, 190, 236, 239; 386/328; 725/113
See application file for complete search history.

(56) References Cited

U.S. PATENT DOCUMENTS

| | | | |
|---|---|---|---|
| 6,411,724 B1 | 6/2002 | Vaithilingam et al. | |
| 6,490,370 B1 | 12/2002 | Krasinski et al. | |
| 6,564,263 B1 | 5/2003 | Bergman et al. | |
| 6,574,279 B1 * | 6/2003 | Vetro et al. | 375/240.23 |
| 6,597,738 B1 | 7/2003 | Park et al. | |
| 6,819,797 B1 | 11/2004 | Smith et al. | |
| 6,873,740 B1 | 3/2005 | Devillers et al. | |
| 7,010,036 B1 | 3/2006 | Mory | |
| 7,532,808 B2 * | 5/2009 | Lainema | 386/328 |
| 2002/0157112 A1 * | 10/2002 | Kuhn | 725/113 |
| 2003/0026340 A1 * | 2/2003 | Divakaran et al. | 375/240.16 |
| 2004/0258153 A1 * | 12/2004 | Linzer | 375/240.16 |
| 2005/0157784 A1 * | 7/2005 | Tanizawa et al. | 375/240.03 |
| 2006/0002474 A1 * | 1/2006 | Au et al. | 375/240.16 |
| 2006/0039476 A1 * | 2/2006 | Watanabe | 375/240.16 |
| 2006/0045349 A1 | 3/2006 | Yamamoto et al. | |
| 2006/0133481 A1 * | 6/2006 | Chujoh | 375/240.03 |
| 2006/0165168 A1 * | 7/2006 | Boyce et al. | 375/240.12 |
| 2007/0121728 A1 * | 5/2007 | Wang et al. | 375/240.18 |

(Continued)

FOREIGN PATENT DOCUMENTS

| | | | | |
|---|---|---|---|---|
| JP | 2006005466 | * | 5/2006 | H04N 7/32 |
| WO | WO03091850 A2 | | 11/2003 | |

OTHER PUBLICATIONS

Kim et al., "Content-Adaptive Utility-Based Video Adaptation", Multimedia and Expo, 2003, ICME '03, Proceedings, Jul. 2003, 4 pages.

(Continued)

*Primary Examiner* — Thai Tran
*Assistant Examiner* — Stephen Smith
(74) *Attorney, Agent, or Firm* — Carole Boelitz; Micky Minhas; Lee & Hayes PLLC

(57) ABSTRACT

The present motion description technique provides a technique for defining a motion description offline. The motion description can then later be extracted from a multimedia representation and adapted to various multimedia-related applications in a manner that not only reduces the processing for motion estimation but also provides high compression performance during an encoding/transcoding process. The motion description technique employs a motion alignment scheme utilizing a hierarchical model to describe motion data of each macroblock in a coarse-to-fine manner. Motion information is obtained for motion vectors of macroblocks for different partition modes. The resulting motion information is compressed based on correlations among spatially neighboring macroblocks and among partition modes to form the offline motion description.

20 Claims, 12 Drawing Sheets

(56) References Cited

U.S. PATENT DOCUMENTS

| | | | |
|---|---|---|---|
| 2007/0217506 A1* | 9/2007 | Yang et al. | 375/240.03 |
| 2007/0230565 A1* | 10/2007 | Tourapis et al. | 375/240.01 |
| 2007/0286286 A1* | 12/2007 | Heng et al. | 375/240.16 |
| 2008/0018782 A1* | 1/2008 | Terakado et al. | 348/376 |
| 2008/0037624 A1* | 2/2008 | Walker et al. | 375/240.01 |
| 2008/0181308 A1* | 7/2008 | Wang et al. | 375/240.16 |
| 2008/0232464 A1* | 9/2008 | Tahara et al. | 375/240.02 |
| 2008/0298464 A1* | 12/2008 | Hinz et al. | 375/240.24 |

OTHER PUBLICATIONS

Lu et al., "Resource-Driven Content Adaptation", Purdue University, School of Electrical and Computer Engineering, Feb. 2006, 11 pages.

Sun et al., "A Motion Activity Descriptor and Its Extraction in Compressed Domain", Lecture Notes in Computer Science, 2001, 8 pages.

Vetro et al., "Object-Based Transcoding for Adaptable Video Content Delivery", IEEE, Transactions on Circuits and Systems for Video Technology, vol. 11, No. 3, Mar. 2001, pp. 387-401.

* cited by examiner

US 8,804,829 B2

OFFLINE MOTION DESCRIPTION FOR VIDEO GENERATION

BACKGROUND

The demand for multimedia, particularly digital video, is continually increasing. Fortunately, there has been a steady increase in available Internet bandwidth to accommodate this demand. However, the available bandwidth for any particular computing device on the Internet varies with the network connectivity of the device. In addition, each computing device may have a different level of resolution and processing capability for handling multimedia.

Different solutions have been developed to accommodate the different capabilities of the computing devices and the various bandwidths available to the computing devices. One solution converts the multimedia into multiple formats at multiple bit rates before sending the multimedia over the Internet. However, this solution requires intensive computation for creating the multiple formats at different bit rates and in addition requires considerable storage space. Another solution compresses video content at a high bit rate using a conventional format. A fast transcoding process is then used. However, this solution is quite computationally complex when multiple contents are served which results in a degradation of the resulting video content during the transcoding process.

The problem with providing multimedia to various computing devices over the Internet is further compounded due to the diverse tasks which users perform with the multimedia on their computing devices, such as video editing, searching, interactive communication, and the like. These different tasks lead to different preferences in presentation styles, formats, and organizations.

Therefore, the ability to provide a seamless media experience over different computing devices and networks for different tasks is still a big challenge with respect to media creation, compression, utilization, storage, and delivery.

SUMMARY

The present technique defines an offline motion description for multimedia. The motion description can be extracted from a multimedia representation and adapted to various multimedia-related applications in a manner that reduces the processing for motion estimation during a transcoding process. The motion description technique employs a motion alignment scheme utilizing a hierarchical model to describe motion data of each macroblock in a coarse-to-fine manner. Motion information is obtained for motion vectors of macroblocks for different partition modes. The resulting motion information is compressed based on correlations among spatially neighboring macroblocks and among partition modes to form the offline motion description.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified. For convenience, the left-most digit of a component reference number identifies the particular Figure in which the component first appears.

DETAILED DESCRIPTION

The following description is directed at an offline motion description technique that defines a motion description offline which not only reduces the processing for motion estimation but also maintains good compression performance during encoding or transcoding. These and other aspects of the present offline multimedia representation technique are now described in detail.

Figure 1:
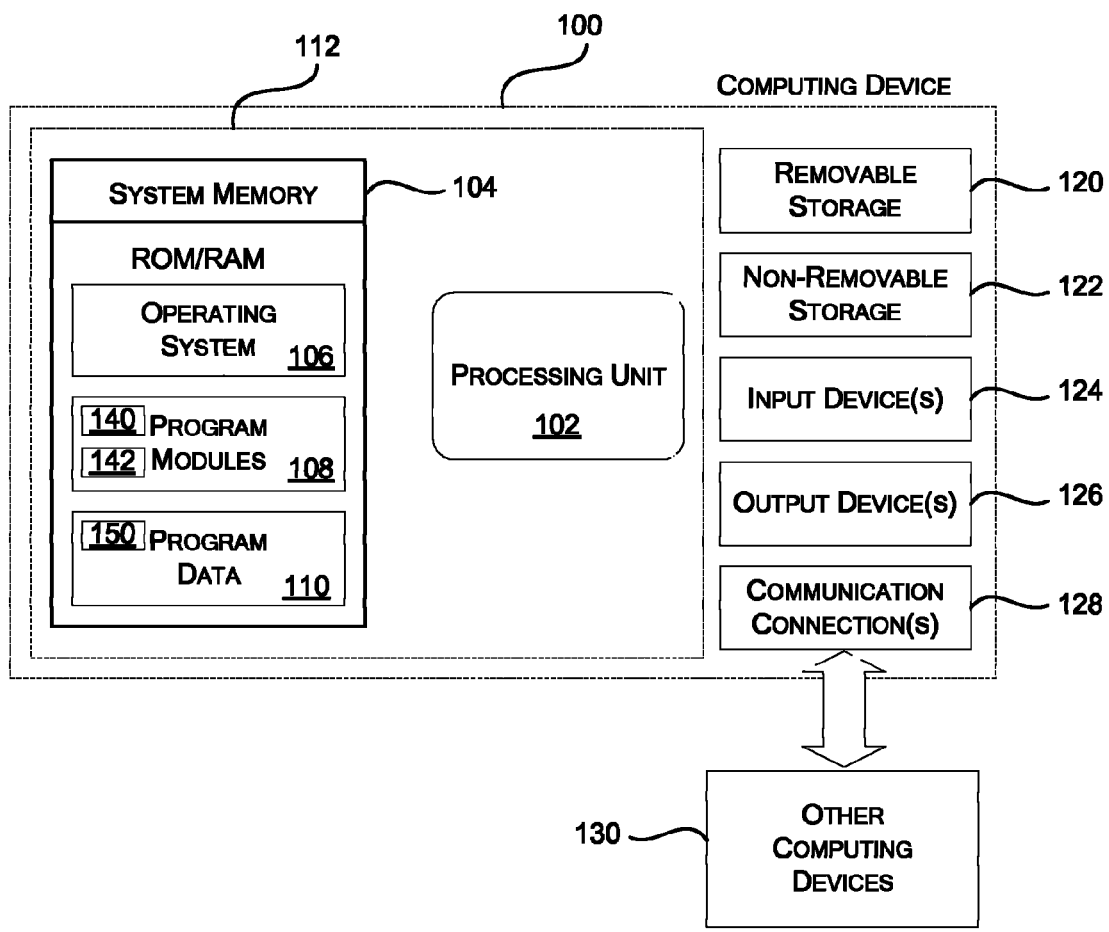
FIG. 1 is an illustrative system that may be used to implement the offline motion description technique described herein.

FIG. 1 is an illustrative system that may be used to implement the offline motion description technique described herein. The system includes a computing device, such as computing device 100. Computing device 100 represents any type of computing device such as a personal computer, a laptop, a server, a game console, a handheld or mobile device (e.g., a cellular phone, digital assistant), and the like. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 106, one or more program modules 108, and may include program data 110. The program modules 108 may include one or more modules 140 for implementing a multimedia representation technique. In addition, program modules 108 may include a graphics application 142 that utilizes the multimedia representation created in accordance with the offline multimedia representation technique. Alternatively, the operating system 106 may include one or more modules for implementing the multimedia representation technique. Program data 110 may include feature data and/or content data 150 generated in accordance with the present offline motion description technique. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 120 and non-removable storage 122. Computer storage media may include volatile and nonvolatile, removable and non-removable media implemented in any method or technology for storage of information, such as computer readable instructions, data structures, program modules, or other data. System memory 104, removable storage 120 and non-removable storage 122 are all examples of computer storage media. Thus, computer storage media is accessible by the computing device 100 and includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Any such computer storage media may be part of device 100.

Computing device 100 may also have input device(s) 124 such as keyboard, mouse, pen, voice input device, touch input device, etc. For example, computing device 100 may include a data capture device as an input device. The data capture device may be a digital/electronic still camera, a video camera, a film/photographic scanner, or the like. Output device(s) 126 such as a display, speakers, printer, etc. may also be included. These devices are well known in the art and are not discussed at length here.

Computing device 100 may also contain communication connections 128 that allow the device to communicate with other computing devices 130, such as over a network. Communication connection(s) 128 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments. An implementation of these modules and techniques may be stored on or transmitted across some form of computer readable media.

Figure 2:
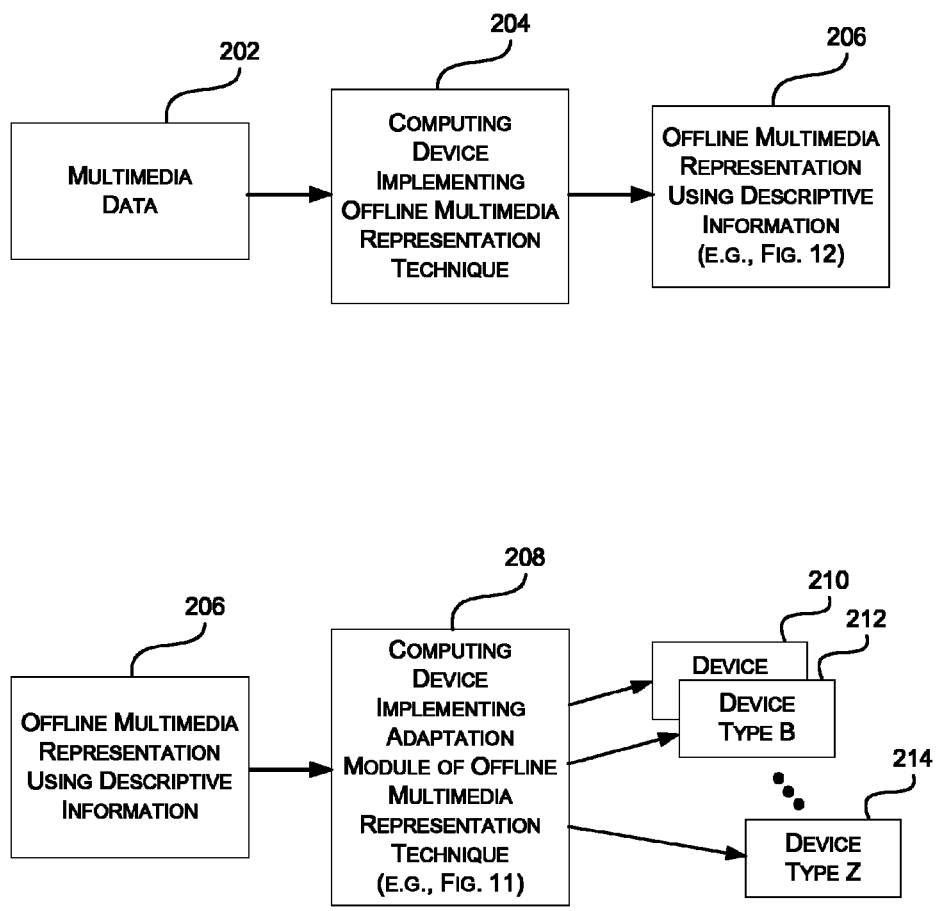
FIG. 2 is a block diagram illustrating the generation of an offline multimedia representation and the adaptation of the offline multimedia representation for use by various computing devices, such as shown in FIG. 1.

FIG. 2 is a block diagram illustrating the generation of an offline multimedia representation and the adaptation of the offline multimedia representation for use by various computing devices, such as a computing device shown in FIG. 1. Multimedia data 202, commonly referred to as multimedia, is input into a computing device 204 that implements an offline multimedia representation technique. Multimedia may include text, graphics, video, animation, sound, and the like. Video is used to describe one embodiment of the present offline multimedia representation technique. However, one skilled in the art will appreciate that the multimedia representation technique may be modified to accommodate other types of multimedia. Computing device 204 converts the multimedia data 202 into a multimedia representation 206 using descriptive information. Through-out the remaining description, a term "intermedia" may be used to refer to the offline media representation using descriptive information. The offline multimedia representation 206 may be stored and/or transmitted to a computing device 208 implementing an adaptation module of the offline multimedia representation technique. Computing device 208 adapts the multimedia representation and may transmit the adapted representation via a network (not shown) to one or more computing devices, such as computing devices 210-214. Computing devices 210-214 may accommodate different bandwidths. In addition, computing devices 210-214 may each have different capabilities, resolution requirements, and/or the like.

In contrast with prior techniques that required the generation of multiple formats at multiple bit rates, the offline multimedia representation technique allows one format (i.e., the intermedia) to accommodate different types of computing devices having different processing capabilities, resolution requirements, and bandwidths. In addition, the offline multimedia representation technique accommodates different application scenarios instead of being focused on one type of application. As will be described, the offline multimedia representation technique represents the multimedia in a manner that supports efficient multimedia compression, multimedia access, and the like.

Different types of multimedia were analyzed to determine which features were "desirable" to be extracted from the multimedia. Once this was determined, each feature was analyzed to determine how to describe the feature. The description of the each feature can then be optimized so that it can empower multimedia adaptations. Lastly, the multimedia representation is evaluated to determine the performance of the resulting video in terms of efficiency as well as adaptation.

Figure 3:
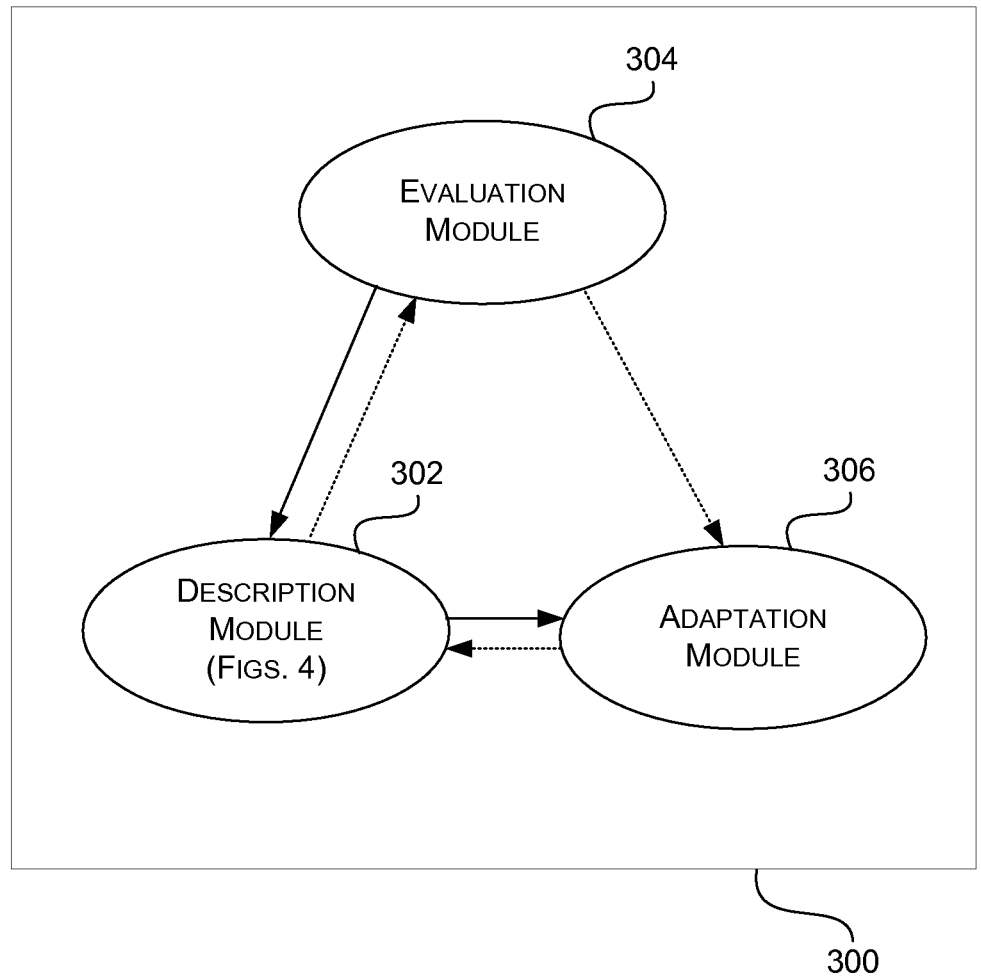
FIG. 3 is a block diagram illustrating exemplary modules for implementing the offline multimedia representation technique.

FIG. 3 is a block diagram illustrating exemplary modules 300 for implementing the offline multimedia representation technique. Dashed lines within FIG. 3 indicate optional dependencies between the modules. Modules 300 include a description module 302 and an evaluation module 304. The description module 302, described in detail later in conjunction with FIG. 4, creates feature descriptions for one or more features of the multimedia. The feature descriptions describe the associated feature in manner that may be included as user data. In addition, description module 302 reforms the content of the multimedia to generate a content description with regard to the extracted features.

Evaluation module 304 provides guidelines for designing the multimedia representation. The evaluation module may implement many different evaluation models where each evaluation model may lead to a different multimedia representation and adaptation technique for the multimedia representation. The evaluation module 304 may provide an objective evaluation and/or subjective evaluation technique. Typically, conventional coding schemes implement an objective technique because objective evaluation is well-defined and easily performed. For example, coding schemes utilize statistical redundancy among pixels in order to obtain high coding efficiency. Peak signal-to-noise ratio (PSNR), which represents the statistical difference of two signals, is commonly used to evaluate the quality of the presented video. The offline multimedia representation technique incorporates PSNR as one objective criterion to guide both the description module 302 and the adaptation module 304. However, in addition, the offline multimedia representation technique includes a subjective criterion that improves the perceptual quality in adaptation. The subjective criterion includes minimum maximum (MINMAX) distortion criterion and weighted mean absolute error (WMAE) criterion and the like. Such criterions measure the difference of two signals by considering some psycho-visual properties of the human visual system in addition to the statistical distortion.

The exemplary modules 300 also include an adaptation module 306. The adaptation module 306 is configured to adapt the multimedia representation into a format for a specific computing device. It was found that by taking advantage of the descriptions provided by the description module 302, a computing device implementing the adaptation module 306 can perform adaptation more efficiently. Thus, the multimedia adaptation schemes within the adaptation module are employed to utilize the available descriptions in the multimedia representation. The adaptation module 306 supports scalabilities in terms of resolution, frame rate, quality, and complexity. An example is described later where the adaptation module utilizes a motion description during a transcoding process. As will be described, a transcoder utilizing the present technique operates faster in comparison with traditional transcoding techniques. One reason is because costly motion estimation does not need to be performed during the transcoding process. In addition, the present technique provides better quality for the resulting video stream at various bit rates.

Figure 4:
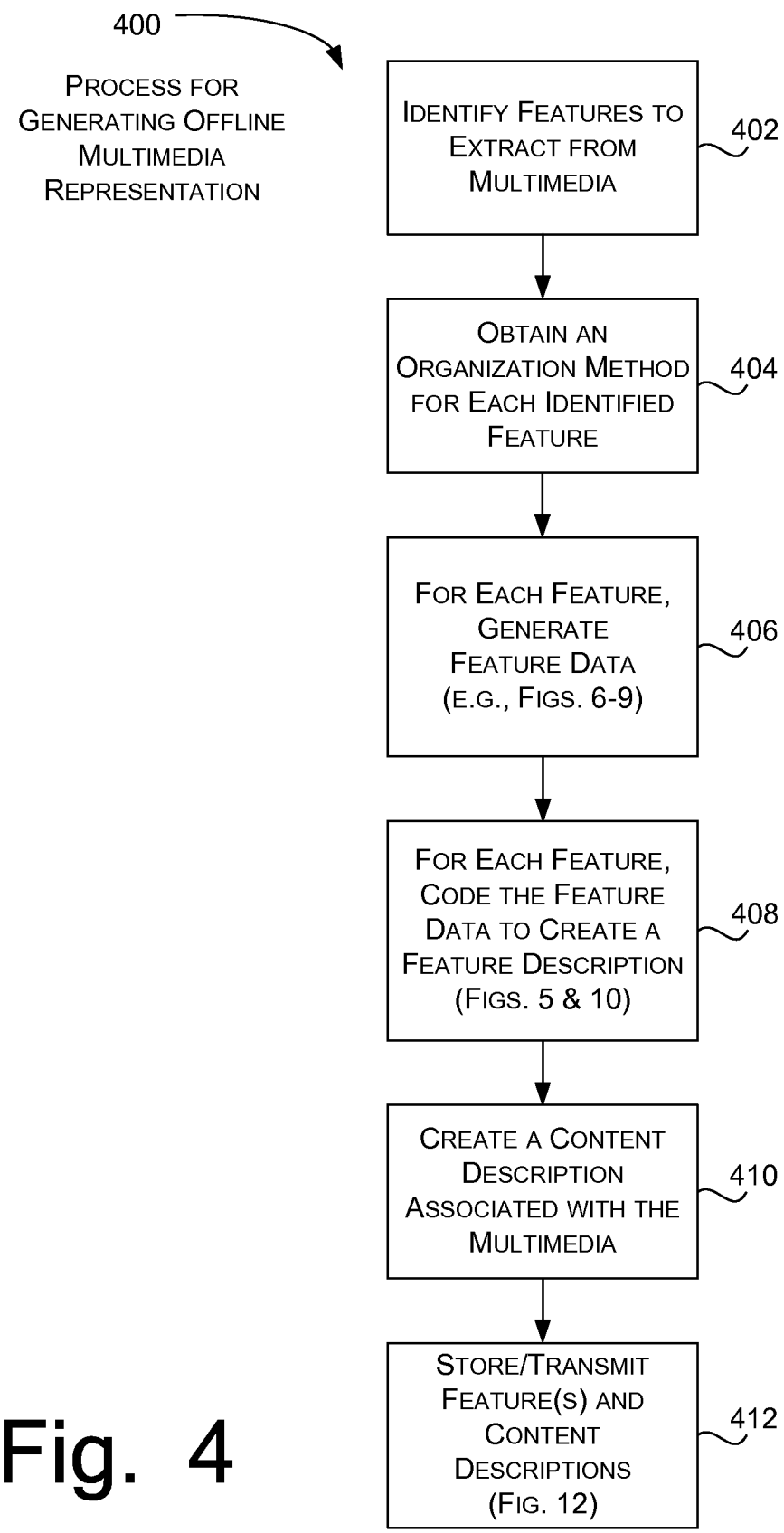
FIG. 4 is a flow diagram illustrating an exemplary process implemented within the description module shown in FIG. 3 for generating the offline multimedia representation.

FIG. 4 is a flow diagram illustrating an exemplary process implemented within the description module shown in FIG. 3 for generating the offline multimedia representation. At block 402, features to extract from the multimedia are identified. These features may be obtained from the evaluation module. In addition, the features may be based on the type of multimedia. Once the features are identified, processing continues at block 404.

At block 404, an organization method is obtained for each feature. The organization method provides a means for structuring the feature into a description that presents the feature in a compact and flexible fashion. One exemplary organization method for feature data is described later in conjunction with an exemplary motion description. As will be shown, the organization method allows the feature description to be conveniently used during adaptation to extract relevant information. Processing continues at block 406.

At block 406, feature data is generated for each identified feature. One exemplary process for generating feature data is described below in conjunction with FIGS. 6-9 for motion data. Processing continues at block 408.

At block 408, the feature data is coded to create a feature description. One exemplary process for coding feature data is described below in conjunction with FIG. 10 for motion description. Processing continues at block 410.

At block 410, a content description associated with the multimedia is created. The content description contains information about the content of the multimedia with regards to the extracted features. For example, a coded video bit stream generated by a video compression scheme can be regarded as a content description of this video in accordance with the motion description. The original video data can be treated as its content description as well. Processing continues at block 412.

At block 412, the content description and the one or more feature descriptions may be optionally stored. Alternatively, the content description and the feature descriptions may be transmitted without storing. However, typically, storing the descriptions is advantageous so that the descriptions need not be generated again. The content description and features description(s) may be stored as metadata in a media file or a stream. For example, multimedia that is a bit stream generated by a video compression scheme may be represented with two descriptions: a feature description that represents motion information and a content description that represents predicted residues. Processing is then complete.

Figure 5:
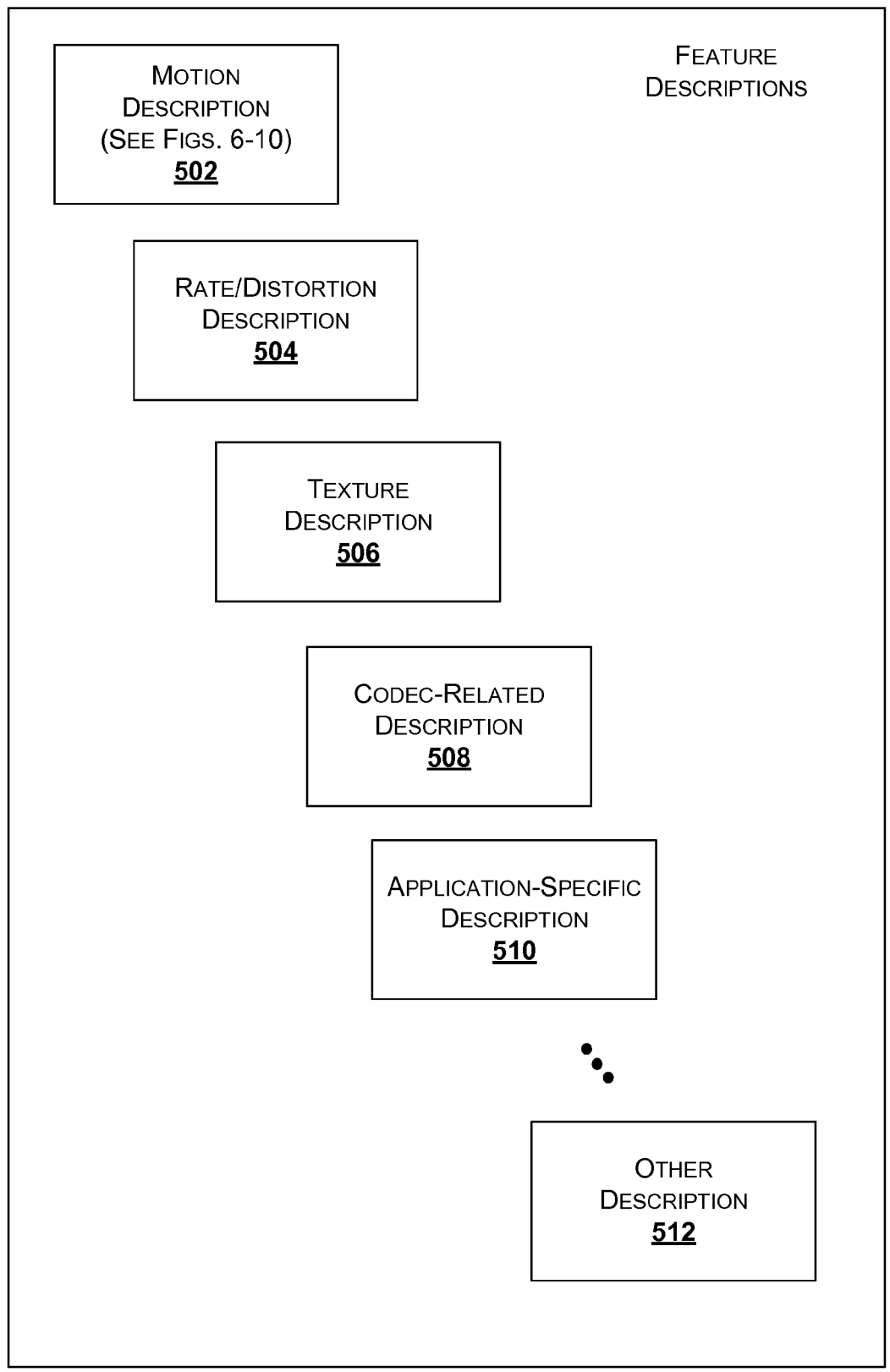
FIG. 5 illustrates exemplary feature descriptions, one or more of which the description module shown in FIG. 3 is configured to create.

FIG. 5 illustrates exemplary feature descriptions, one or more of which may be created by the description module shown in FIG. 3. The description module creates feature descriptions depending on the type of multimedia. The feature descriptions may include a motion description 502, a texture description 506, and a rate/distortion description 504. In addition, the feature descriptions may include codec-related descriptions 508 and application-specific descriptions 510, such as scene change, object, edge, region of interested as well as semantic features. In addition, one skilled in the art will recognize that other descriptions 512 associated with other features may be created using the technique described herein. While there may be many different implementations for each of the descriptions, the following discussion describes an exemplary implementation for a motion description.

Figure 6:
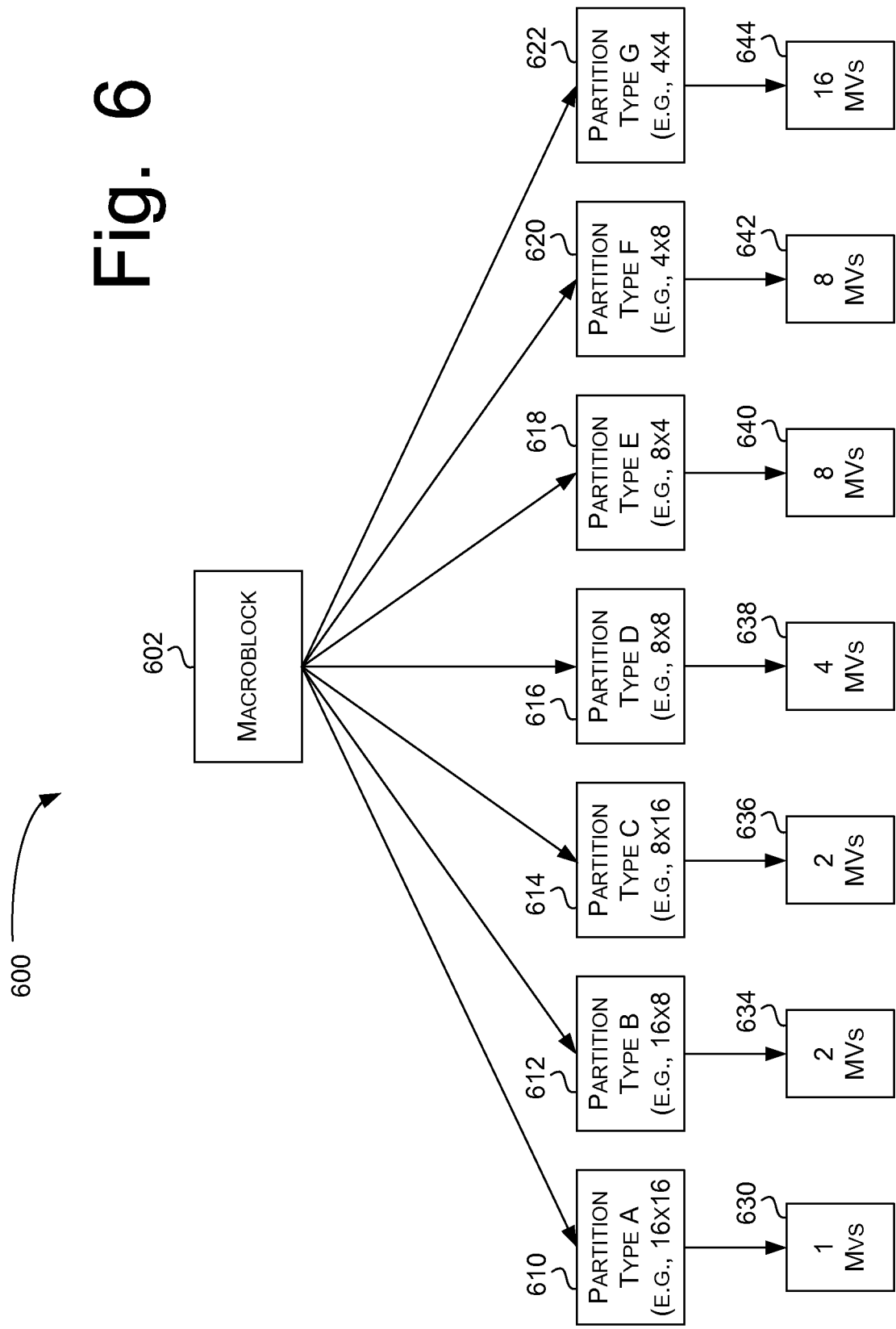
FIG. 6 is an exemplary hierarchical model for representing the feature description associated with motion in accordance with the present offline motion description technique.

As mentioned above, each feature description is associated with an organization method. FIG. 6 is an exemplary organization method 600 for representing the feature description associated with motion data. The organization method 600 includes a hierarchical motion description model based on a digital video coding standard commonly referred to as H.264, MPEG-4, or Advanced Video Coding (hereinafter, the term H.264 is used). However, those skilled in the art will appreciate that the motion description may be modified using the teachings of the present technique to accommodate other coding techniques without departing from the scope of the present technique.

In overview, H.264 provides a variable block size optimization technique that greatly improves coding efficiency. Each macroblock in inter mode prediction can be divided into block partition of sizes 16×16, 16×8, 8×16 or 8×8 pixels, and the 8×8 block can be further divided into 8×4, 4×8, and 4×4 blocks. Each macroblock is allowed to have a different number of motion vectors depending on its partition mode. The optimal partition mode as well as optimal motion vectors for a macroblock is determined by a conventional Lagrange cost function, $J=D+\lambda \times R$, where D is the distortion of the reconstructed frame, R is the bit-rate of coded motion (including mode) data and quantized coefficients, and $\lambda$ is a Lagrange multiplier that is related to quantization parameters. Thus, determining the optimal partition mode is quite computationally complex. In addition, once the optimal partition mode is determined, the resulting motion vectors are strongly bound to the target bit-rate. If the motion data obtained using the H.264 coding technique at high bit rates is directly applied to generate bit streams at low bit rates, the coding efficiency may drop more than 6 dB. This presents challenges to existing fast transcoding techniques because motion re-usage is no longer appropriate to transcode H.264 bit streams. Instead, the motion data needs to be refined or re-estimated to support the given target bit rate.

The exemplary organization method 600 for the motion description is defined based on the observation that current video coding techniques employ increasingly complex motion estimation in order to reduce the redundancy between frames as the bit rate increases. This results in motion vectors that are highly related to the quality of reference and the target bit rate. In other words, even though the same video content is encoded, the resulting sets of motion vectors produced during rate-distortion optimal motion estimation for bit streams at different bit rates are quite different.

The goal of the offline multimedia representation is to define an off-line motion description that will greatly lighten or even eliminate motion estimation during encoding or transcoding. This will allow motion data to be extracted directly from the off-line motion description at any target bit-rate which will reduce the processing complexity of encoding and transcoding. Defining the off-line motion description that will achieve the goal is quite difficult. The difficulty is due to the fact that motion data at different bit rates is quite different. In addition, motion data of a macroblock encoded using most current coding techniques is strongly related to its reference quality and related to motion data of temporally and spatially neighboring macroblocks.

In order to achieve the desired goal, the exemplary motion description technique introduces a motion alignment scheme. The motion alignment scheme utilizes a hierarchical model to describe motion data of each macroblock in a coarse-to-fine manner. As shown in FIG. 6, the hierarchical model 600 organizes motion data by partition modes 602-622 rather than by quantization steps. A pre-processing approach is developed to obtain motion information for the motion vectors of every macroblock under all of the partition modes 602-622. Then, the resulting motion information is efficiently compressed based on the correlations among spatially neighboring macroblocks and among partition modes to form the off-line motion description for the video content. The size of the resulting motion description is very small in comparison with the raw sequence or a high bit-rate stream.

One approach for creating a motion description may be to record the motion data generated at each quantized parameter setting in series. Then, given a target quantized parameter, the corresponding motion data could be obtained directly from the motion description. This would provide the exact same performance as the H.264 standard. However, this approach results in a large volume of motion data which has many redundant motion vectors among the sets of motion data. While the redundant motion vectors may be directly reduced or merged, the coding performance is significantly reduced. In addition, it is hard for this approach to record motion data when macroblocks in one frame at different quantized parameters to support constant bit rate due to the extremely high processing complexity as well as the huge number of candidate motion data. Instead, it is desirable to have the motion information assembled by extracting the motion vectors from different sets of recorded motion data.

FIG. 6 illustrates a hierarchical model organizing feature data associated with motion (i.e., motion data) utilizing motion alignment. The motion alignment provides a means for describing the motion vectors of each macroblock. As shown, in this exemplary hierarchical model, motion data is organized into seven groups 610-622 according to the partition modes of the H.264 standard. Groups 610-622 correspond to 16×16, 16×8, 8×16, 8×8, 8×4, 4×8, and 4×4 partition modes, respectively. Skip mode and direct mode in H.264 are converted into partition mode 610 in order to reduce the dependency among macroblocks. In each group, there may be several sets of motion vectors dependent on different quality references and neighboring motion vectors. For example, group 610 may have one set of motion vectors 630, group 612 may have two sets of motion vectors 634, group 614 may have two sets of motion vectors 636, group 616 may have four sets of motion vectors 638, group 618 may have eight sets of motion vectors 640, group 20 may have eight sets of motion vectors 642, and group 622 may have sixteen sets of motion vectors 644. If any of the groups 610-622 do not have any motion vectors (i.e., NULL motion vectors), this indicates that encoding has not taken place for this group (i.e., mode).

For H.264, the optimal motion vectors and mode of one macroblock is determined based on information about the reference and the motion vectors of adjacent macroblocks. However, reference and adjacent motion vectors are unavailable until real encoding. Therefore, the exemplary process for creating motion descriptions generates the set of motion vectors of each group "offline" or pre-computes the set of motion vectors. As it will be shown, by pre-computing the sets of motion vectors, the transcoding process may be able to eliminate the computationally complex process of motion estimation.

Figure 7:
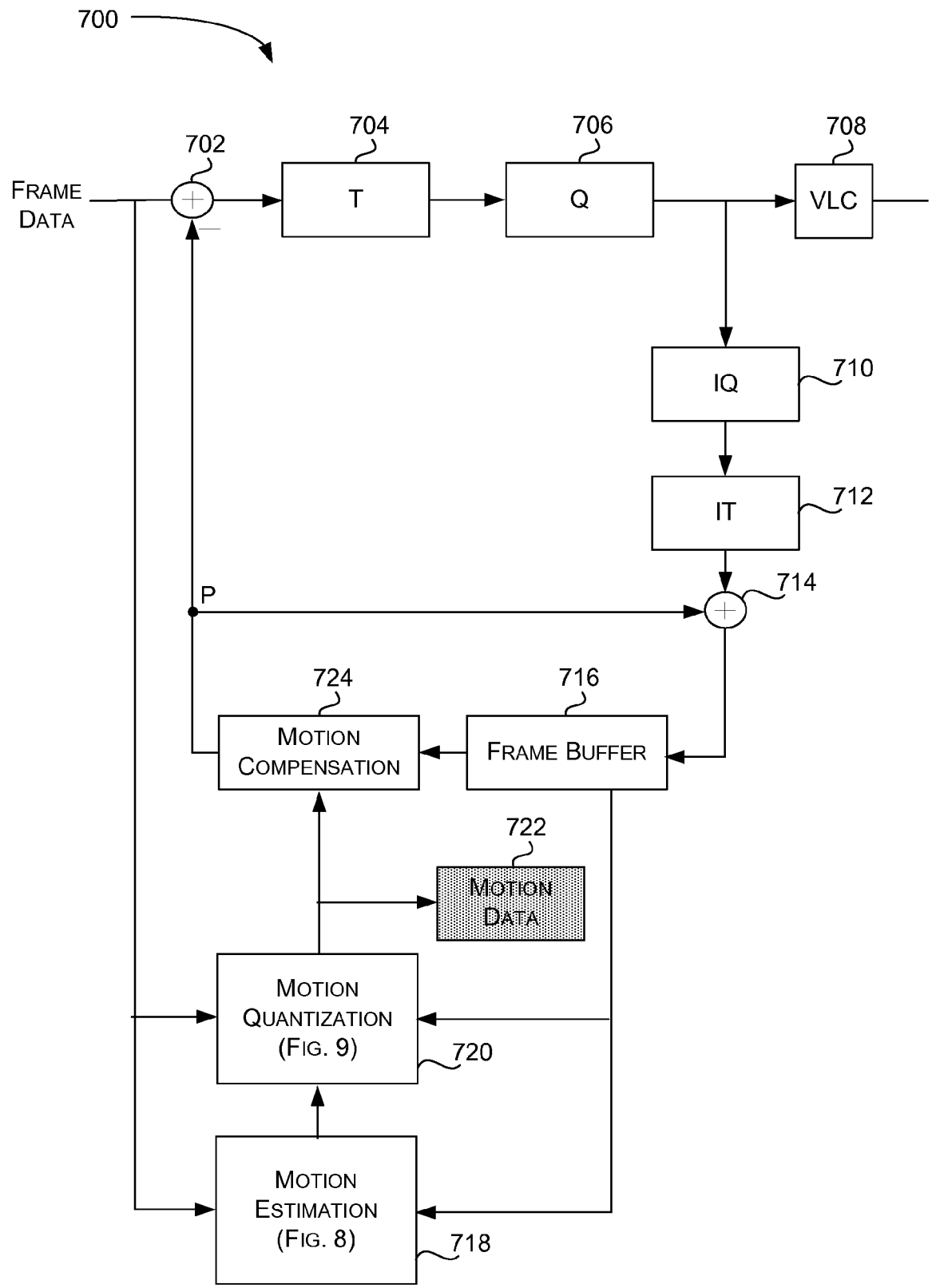
FIG. 7 is a block diagram illustrating exemplary modules for generating the feature data associated with motion in accordance with the present offline motion description technique.

FIG. 7 is a block diagram illustrating exemplary modules for generating feature data associated with motion (i.e., motion data 722). As shown, a motion quantization module 720 is included with conventional encoder modules. In addition, motion estimation module 718, motion compensation module 724 and frame buffer module 716 are modified to support the present offline motion description technique. Encoder 700 is then configured to generate motion data 722 offline which is organized as one or more sets of motion vectors for each group as illustrated in FIG. 6.

Encoder 700 includes two dataflow paths: 1) a "forward" path through transform module 704, quantization module 706, and entropy encoding module 708 (708 is optional for offline motion description); and 2) a "reconstruction" path through inverse quantization module 710 and inverse transform module 712. An input frame (frame data) is presented for encoding. The frame data is processed in units of a macroblock. In the "forward" path, a difference (i.e., residual macroblock) is calculated between a current macroblock and a prediction macroblock P that was formed in the reconstruction path. The residual macroblock is transformed using transform module 704 and quantized using quantization module 706. After the quantization module 706, a set of quantized transform coefficients are output. These quantized transform coefficients may be re-ordered and then entropy encoded using entropy encoding module 708. In conventional H.264 encoders, the entropy-encoded coefficients, the macroblock prediction mode, the quantization parameters, and the motion vector information form a compressed bitstream that can then be transmitted or stored. However, as mentioned above, bit rate as well as video quality of this bitstream is dependent on the selected quantization parameter. For H.264, the choice selected for the quantization parameter affects the encoding efficiency and is typically set as to produce a given quality considering the trade-off between quality and bit rate. A higher quantization parameter results in better compression, but degraded quality. The quantization parameter varies from 1 to 31 in steps of 1. As will be described below, the exemplary motion description technique does not generate motion data 722 that is dependent on one quantization parameter (QP).

Briefly, motion estimation module 718, described later in detail in conjunction with FIG. 8, determines the optimal modes and motion vectors corresponding to different quantization parameters for each macroblock. The quantization parameters for each macroblock may range from $QP_{min}$ (the smallest QP to be supported) to $QP_{max}$ (the largest QP). Motion quantization module 720, described later in detail in conjunction with FIG. 9, organizes the motion vectors generated at different quantization parameter settings to generate motion data 722. Motion quantization module 720 organizes the motion vectors based on the organization method illustrated in FIG. 6. Because one partition mode may be selected multiple times at different settings for the quantization parameter for the same macroblock, different sets of motion vectors may be generated for one mode as illustrated in FIG. 6. Therefore, motion quantization module 720 is further configured to reduce the number of sets of motion vectors included in the motion data. Frame buffer 716 holds the reconstructed references at different quantization parameter settings.

Figure 8:
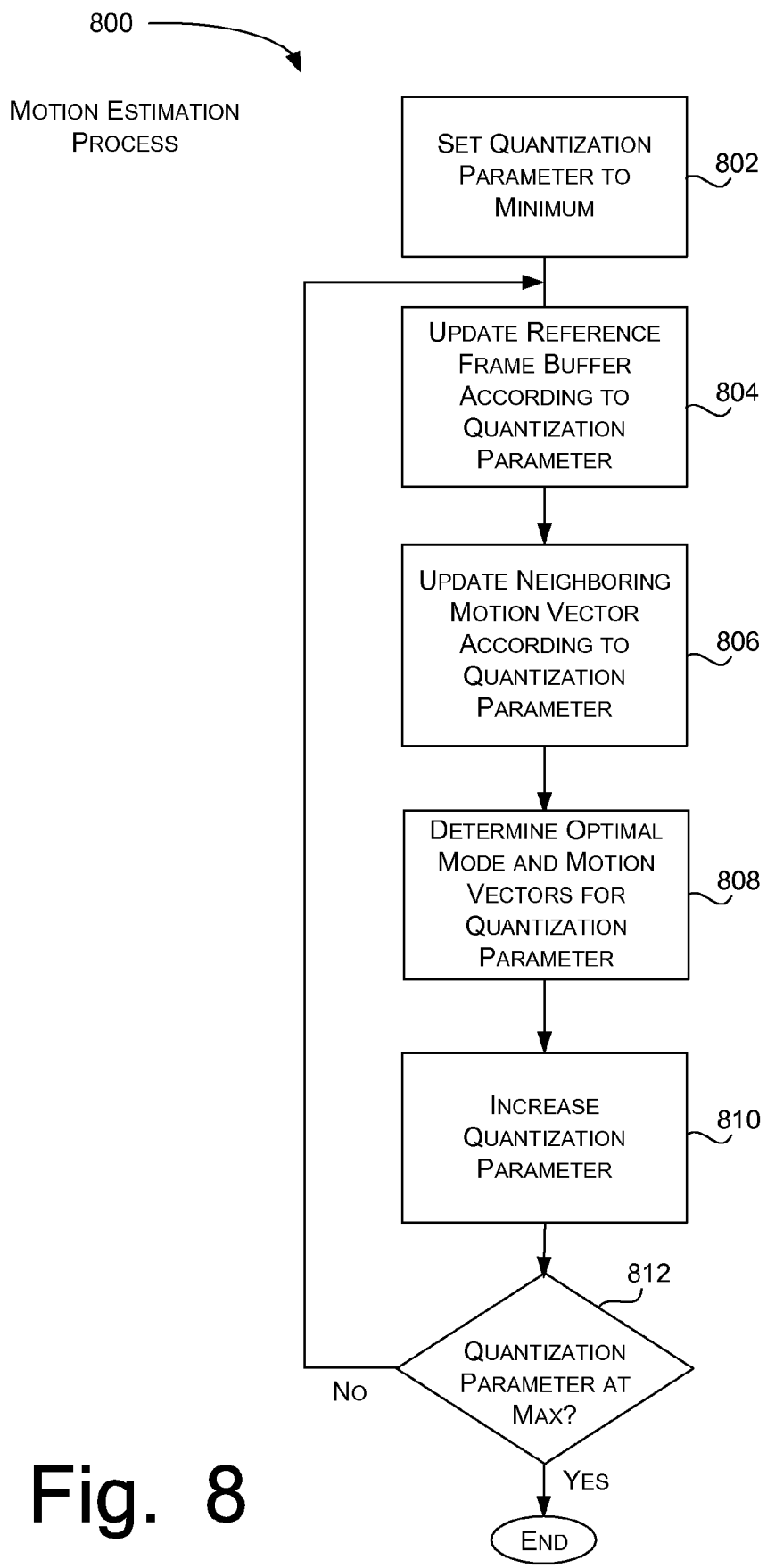
FIG. 8 is a flow diagram illustrating an exemplary motion estimation process suitable for use within the motion estimation module shown in FIG. 7.

FIG. 8 is a flow diagram illustrating an exemplary motion estimation process suitable for use within the motion estimation module shown in FIG. 7. The motion estimation process begins at block 802 where the quantization parameter is set at a minimum value. Processing continues at block 804.

At block 804, the frame buffer is updated with a new reconstructed reference associated with the quantization parameter. At block 806, neighboring motion vectors are updated according to the quantization parameter. At block 808, optimal mode and motion vectors are determined based on the quantization parameter. At block 810, the quantization parameter is increased in order to obtain optimal mode and motion vectors for different quantization parameter settings. At decision block 812, the process ends for one frame once the quantization parameter has reached its maximum setting. Therefore, one partition mode may be selected multiple times at different settings for the quantization parameter for one macroblock with different sets of motion vectors (e.g. group 610 may have two sets of motion vectors for quantization parameters QP1 and QP2 respectively). However, one will note that candidate modes for one quantization parameter QP have their sub-block size at no smaller than the previous selected mode for the quantization parameter QP-1. For example, suppose that the optimal mode and motion information are searching at quantization parameter QP. If the selected partition mode at QP-1 is 8×8, then the candidate modes at QP are 8×8, 8×16, 16×8 and 16×16 partitions which have sub-block size no smaller than the previous selected mode 8×8 at QP-1.

Figure 9:
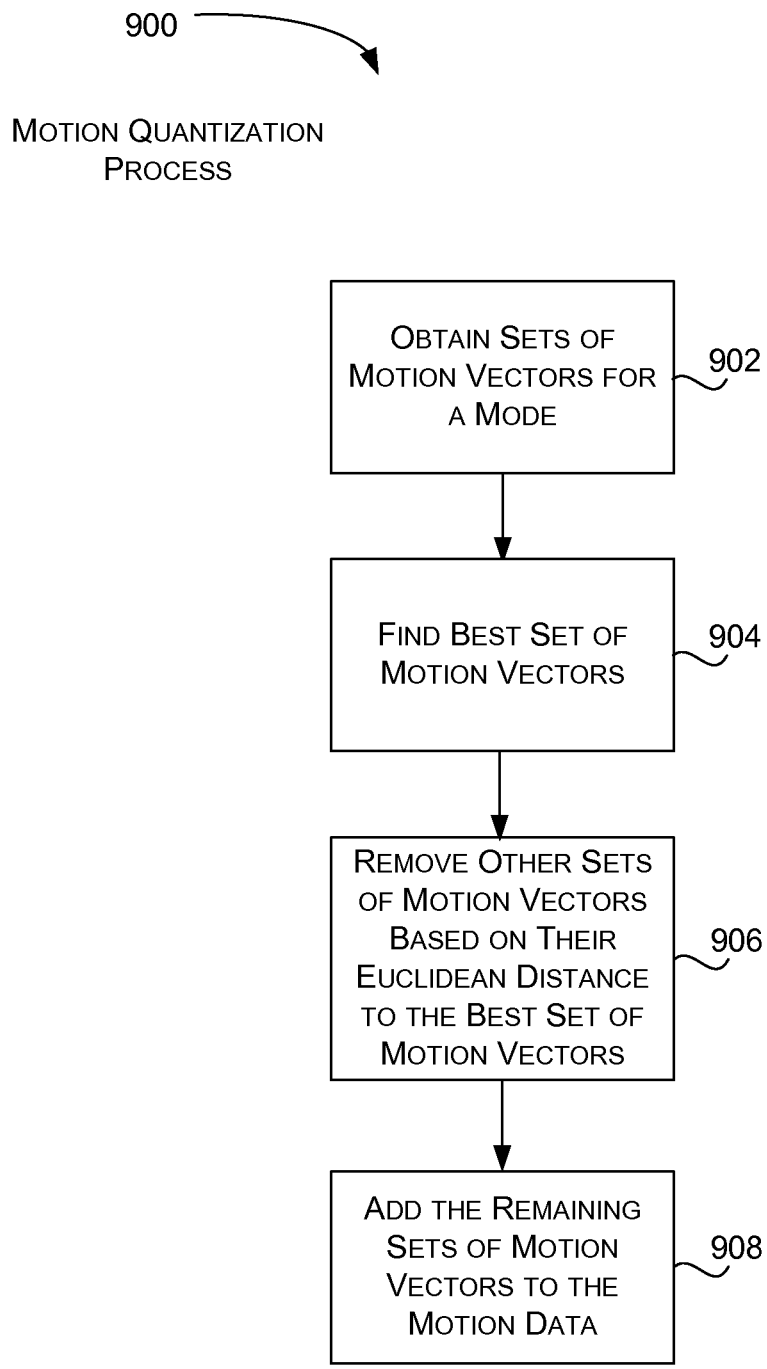
FIG. 9 is a flow diagram illustrating an exemplary motion quantization process suitable for use within the motion quantization module shown in FIG. 7.

FIG. 9 is a flow diagram illustrating an exemplary motion quantization process suitable for use within the motion quantization module shown in FIG. 7. Motion quantization process 900 begins at block 902 where each set of motion vectors generated for one mode for one macroblock are obtained. At block 904, the best set of motion vectors $MV_{best}$ is found which minimizes the following equation:

$$MV_{best} = \underset{i \in S}{\mathrm{argmin}} \sum_{j \in G} (SAD(mv_i) + \lambda_j * R_{mv_i})$$

where S is all sets of motion vectors, G is the quantization parameter collection corresponding to mode A, and $\lambda_j$ is the Lagrange multiplier for the jth quantization parameter (i.e., $QP_j$). At block 906, the sets of motion vectors other than $MV_{best}$ are removed based on their Euclidean distance to the best set of motion vectors. In one implementation, the motion vectors are removed if the Euclidean distance is smaller than a given threshold, such as 120 for one macroblock or 30 for an 8×8 block. At block 908, the remaining sets of motion vectors are included in the motion data. The motion quantization process is then complete.

Figure 10:
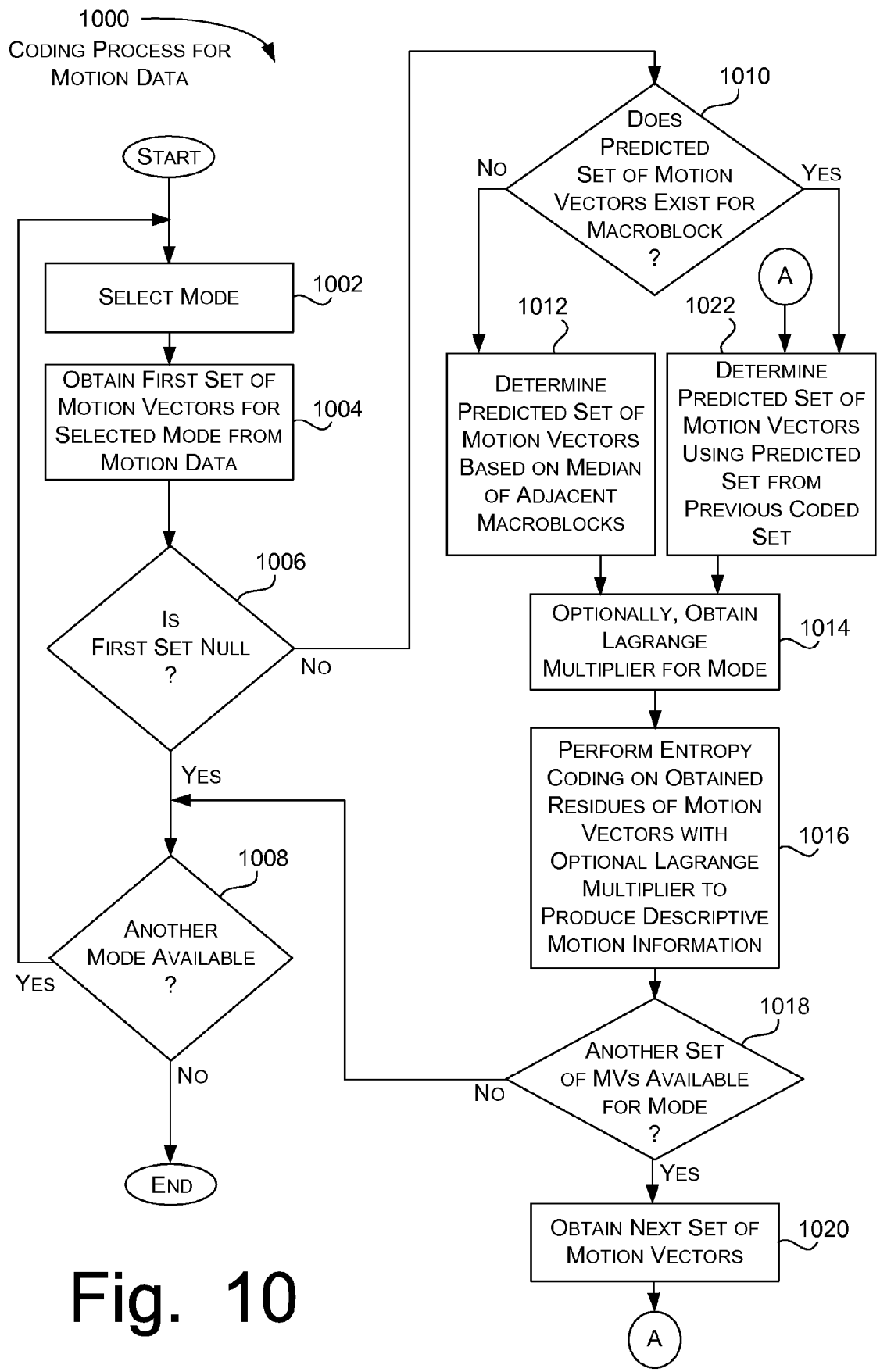
FIG. 10 is a flow diagram illustrating an exemplary coding process suitable for use in the flow diagram shown in FIG. 4.

FIG. 10 is a flow diagram illustrating an exemplary coding process suitable for use in the flow diagram shown in FIG. 4. In overview, the coding process 1000 codes motion vectors of a macroblock according to the sub-block size from big to small and a set of predicted motion vectors is formed by taking into account the correlation of the adjacent macroblocks as well as previous modes. The coding process 1000 is performed for each macroblock and begins at block 1002 where a mode is selected. In one embodiment, the mode with the largest sub-block size is selected first. At block 1004, a first set of motion vectors associated with the selected mode is obtained. At decision block 1006, a determination is made whether the first set of motion vectors is empty (e.g., NULL). As mentioned above, if a mode does not have motion vectors, this indicates that motion data was not encoded for this macroblock at this mode. Processing then continues at decision block 1008 where a determination is made whether there is another mode available for coding. If there is another mode available, processing loops back to block 1002 and continues as described above. Otherwise, once all the modes have been processed, the coding process 1000 is complete.

Once a first set of motion vectors is confirmed at decision block 1006, processing continues at decision block 1010. At decision block 1010, a determination is made whether a predicted set of motion vectors exists for this macroblock. As mentioned above, the predicted motion vectors take into account previously coded motion vectors for the macroblock. If there is not any predicted motion vectors associated with the macroblock, processing continues at block 1012. Otherwise, processing continues at block 1022 as will be described later.

At block 1012, a predicted set of motion vectors is determined based on a median of the motion vectors from adjacent macroblocks (e.g., left, up, up-right macroblocks). One will note that the macroblock to its right is not considered when predicting the set of motion vectors. Processing continues at block 1014.

At block 1014, an optional Lagrange multiplier associated with the mode is obtained. This Lagrange multiplier can then be used when performing entropy coding on the residues of the motion vectors to produce descriptive motion information. As will be described below, if the Lagrange multiplier is used, it can be used during adaptation to significantly reduce the complexity of the motion extraction. Once all the macroblocks have been processed, the descriptive motion information for each macroblock at each mode is combined to form the motion description. Processing continues at decision block 1018.

At decision block 1018, a determination is made whether another set of motion vectors is available for the current mode. If there is not another set, processing continues at decision block 1008 and proceeds as described above. If, however, there is another set of motion vectors, processing continues at block 1020 where the next set of motion vectors is obtained. Processing then continues at block 1022.

At block 1022, a predicted set of motion vectors associated with the set of motion vectors is determined using the previous coded set. The previous coded set may be from the same mode or a prior mode. In other words, once one set of motion vectors is coded, subsequent calculations for predicted motion vectors utilize the prior coded sets. Processing then continues to block 1014 and proceeds as described above.

Process 1000 reflects the observation that the correlation between the motion vectors of different modes for one macroblock is stronger than that of its neighboring macroblocks. Therefore, the present technique codes the motion vectors of one macroblock according to the sub-block size from biggest to smallest. A predicted motion vector, MVP, is then formed by taking into account the correlation of the adjacent macroblocks as well as the modes.

Furthermore, it was noted that the smaller the quantization parameter, the smaller the partition mode that is selected in most cases. Accordingly, the present technique incorporates a constraint in the hierarchical model, namely, when a mode is selected for one macroblock at a certain quantization parameter using the Lagrange cost function, subsequent modes with larger sub-block sizes will not be selected for the macroblock when the quantization parameter increase. It was also noted that this constraint had little effect on coding efficiency.

Figure 11:
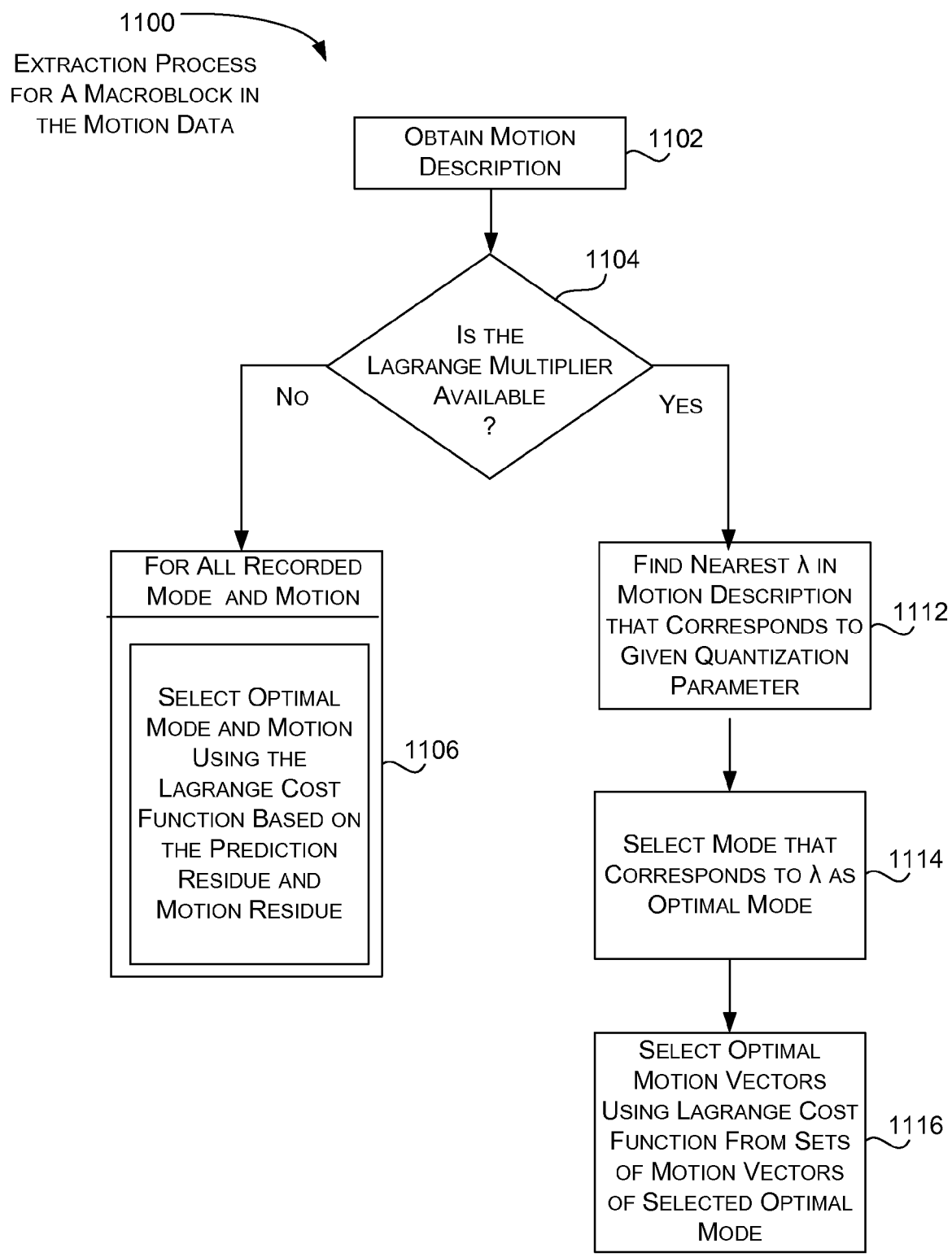
FIG. 11 is a flow diagram illustrating an exemplary extraction process suitable for adapting the multimedia representation based on motion data performed by the adaptation module shown in FIG. 3.

FIG. 11 is a flow diagram illustrating an exemplary extraction process suitable for adapting a multimedia representation which incorporates the present motion description. The extraction process is performed by the adaptation module shown in FIG. 3. The extraction process 1100 begins at block 1102 where the motion description is obtained. One will note that the motion description includes the descriptive motion information that was calculated in FIG. 10 for each macroblock. Processing continues at decision block 1104.

At decision block 1104, a determination is made whether a Lagrange multiplier is available. If the Lagrange multiplier is available processing continues at block 1112. However, if the Lagrange multiplier is not included in the motion description, processing continues at block 1106.

At block 1106, all the recorded mode and motion vectors are checked using the Lagrange cost function. This calculation utilizes the predicted residue and the motion residue. Once the optimal mode and motion vector are selected, the motion data is extracted.

One will note that the above process does not need to use reconstructed references. Instead, the motion vectors in the description were sufficiently accurate so that the distortion D and the rate R in the Lagrange cost function could be computed using the predicted residue and the motion residue instead. This makes the selection process much more efficient without loss in performance. However, when the Lagrange multiplier is included, the motion extraction can even be further accelerated.

In that case, processing continues at block 1112 where the nearest Lagrange multiplier that corresponds to the given quantization parameter is located. One will noted that the LaGrange multiplier indicates the slope of the RD curve. Once the Lagrange multiplier is located, processing continues at block 1114.

At block 1114, the mode that corresponds to the LaGrange multiplier is selected as the optimal mode. Therefore, one will note that for this embodiment the optimal partition mode for each mode does not need to be calculated. Processing continues at block 1116.

At block 1116, the optimal motion vector is selected from sets of motion vectors of the selected optimal mode. When there are more than one candidate set of motion vectors, the optimal motion vector may be selected using the Lagrange cost function with the optimal mode found in block 1114. Motion vectors for other modes can be ignored. Thus, the complexity of the motion extraction can be significantly reduced when the Lagrange multiplier is coded within the motion description.

Figure 12:
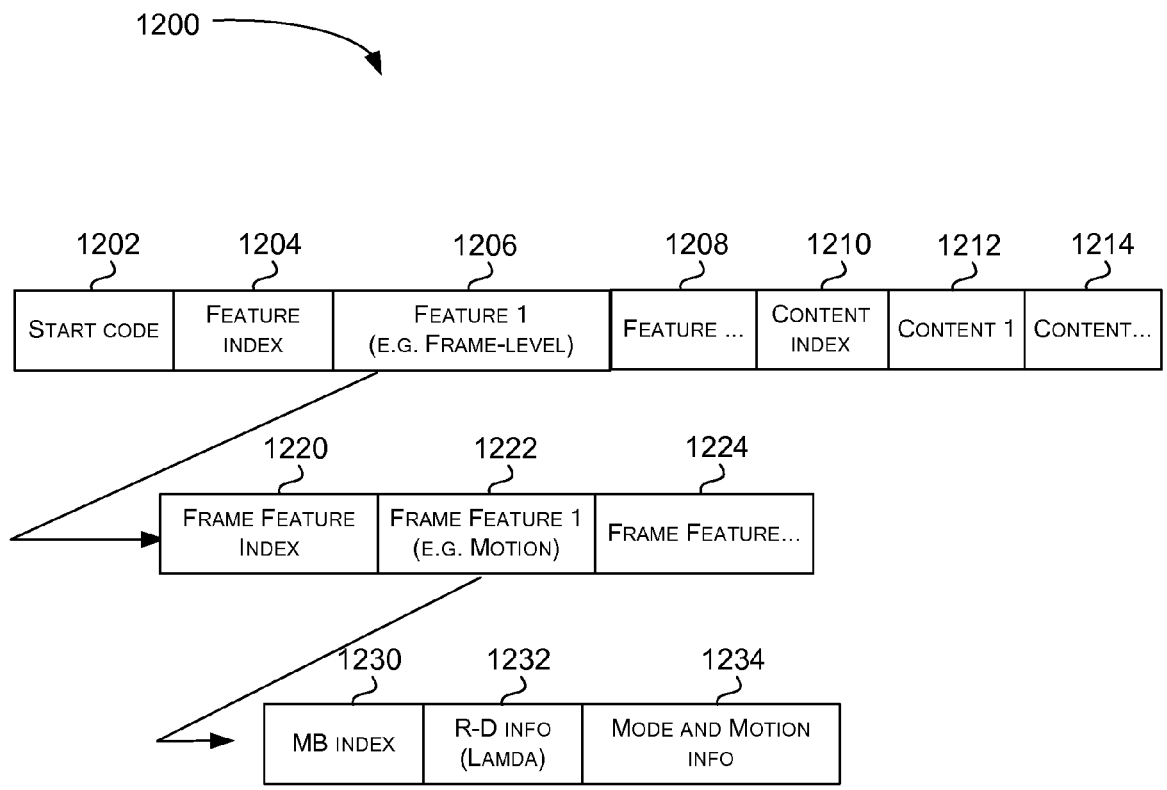
FIG. 12 is an exemplary format for a multimedia representation.

FIG. 12 is an exemplary format for a multimedia representation generated in accordance with an offline multimedia representation technique. The multimedia representation 1200 includes a start code 1202, a feature index 1204, one or more features (e.g., features 1206 and 1208), a content index 1210, and one or more content blocks (e.g., content blocks 1212 and 1214). Feature 1206 may include a frame feature index 1220, a frame feature 1222 and 1224. The frame feature 1222 may include a macroblock index 1230, a rate-distortion information block 1232 and mode/motion information 1234.

The motion description may be stored as user data in a media file or in a stream. The overhead for the motion description is typically less than 4% of the total bits of the raw video for each frame. Because the offline multimedia representation technique processes the feature descriptions offline, the technique decreases the amount of computation needed during transcoding. As illustrated, when the feature description is related to motion data, the technique can produce a H.264 video stream at any bit-rate without the complicated estimation process. Thus, this technique can be used to empower video adaptation for applications, such as video streaming, IPTV, video sharing, and the like. For example, in the case of video streaming, the motion description could be produced in advance and stored as user data in a server. Whenever a H.264 transcoding or encoding was needed, the server could easily extract a set of proper motion vectors from the motion description and apply them into stream generation. Because motion estimation does not need to be performed, bit-streams which meet the bandwidth can be real-time generated with high coding efficiency comparable with that of H.264.

While example embodiments and applications have been illustrated and described, it is to be understood that the invention is not limited to the precise configurations and resources described above. Various modifications, changes, and variations apparent to those skilled in the art may be made in the arrangement, operation, and details of the disclosed embodiments herein without departing from the scope of the claimed invention.

What is claimed is:

1. A method that when executed by a computing device creates motion information for each macroblock in a frame of multimedia, the method comprising:

performing motion estimation on a macroblock at a plurality of quantized parameter settings to obtain motion data for the macroblock, the motion data being organized into a plurality of groups according to a set of partition modes, each group having one or more motion vectors, the set of partition modes including a partition mode that is converted from a skip mode and a direct mode in order to reduce dependency between the macroblock and at least one other macroblock; and coding the motion data to generate a motion description that enables the motion data to be extracted at a plurality of different target bit-rates without the motion estimation during encoding or transcoding of the multimedia.

2. The method of claim 1, wherein motion estimation comprises:

a) setting a quantized parameter at a minimum;
b) determining at least one set of motion vectors for each of a plurality of modes based on the quantized parameter setting; and
c) increasing the quantized parameter and repeating steps a-c) until the quantized parameter is at a maximum.

3. The method of claim 2, wherein the quantized parameter settings corresponds to quantization steps associated with an H.264 encoding technique.

4. The method of claim 2, further comprising quantizing the sets of motion vectors for the plurality of modes by eliminating a redundant set of motion vectors out of the sets of motion vectors, wherein the redundant set of motion vectors is a duplicate of one of the sets of motion vectors.

5. The method of claim 4, wherein quantizing the sets of motion vectors further comprises:
  Obtaining one or more sets of motion vectors associated with one mode for one macroblock;
  finding a most suitable set of motion vectors out of the obtained sets that are associated with the one mode for the one macroblock for minimizing a minimization function;
  removing a set of motion vectors not identified as the most suitable set of motion vectors based on an Euclidean distance between the set and the most suitable set to obtain one or more remaining sets of motion vectors; and
  adding the one or more remaining sets of motion vectors as the motion data.

6. The method of claim 1, wherein coding the motion data comprises:
  predicting a first predicted set of motion vectors from the set of motion vectors first obtained from the motion data for a selected mode; and
  determining subsequent predicted sets of motion vectors based on the first predicted set.

7. The method of claim 6, wherein the subsequent predicted sets of motion vectors are from a the same mode.

8. The method of claim 6, wherein the subsequent predicted sets of motion vectors are associated with a different mode.

9. The method of claim 6, wherein the first predicted set of motion vectors is predicted based on a median for motion vectors in adjacent macroblocks.

10. The method of claim 9, wherein the adjacent macroblocks comprise a left macroblock, an up macroblock and an up-right macroblock.

11. The method of claim 1, wherein the coding comprises entropy coding motion residues of the motion vectors in a group with a Lagrange multiplier of a corresponding mode.

12. A method that when executed by a computing device extracts motion data, the method comprising:
  obtaining motion description information for a macroblock in a frame of multimedia;
  calculating partition modes using a Lagrange cost function based on a predicted residue that corresponds to one or more encoded content features and a motion residue of a motion vector in the descriptive motion information;
  selecting an optimal mode from the calculated partition modes using the Lagrange cost function; and
  selecting an optimal motion vector that corresponds to the selected optimal mode using the Lagrange cost function.

13. The method of claim 12, wherein the predicted residue and motion residue comprise metadata.

14. The method of claim 12, wherein the predicted residue and the motion residue are organized hierarchically within the descriptive motion information.

15. The method of claim 12, wherein the optimal motion vector and the optimal mode are determined according to a target quantization parameter.

16. A computing device, comprising:
  a processor;
  a memory into which a plurality of instructions are loaded, wherein upon execution of the plurality of instructions by the processor, the computing device performs acts comprising:
  organizing motion data in a plurality of macroblocks of an image based on a hierarchical model that includes a plurality of partition modes of various sub-unit sizes, the plurality of partition modes including a partition mode that is converted from a skip mode and a direct mode in order to reduce dependency between a macroblock and at least one other macroblock;
  coding motion information of the image offline based on correlations between spatially neighboring macroblocks that includes motion vectors to form a motion description;
  identify a Lagrange multiplier within the motion description created offline that corresponds to a quantization parameter;
  select a mode that corresponds directly to the Lagrange multiplier as an optimal mode; and
  select an optimal set of motion vectors from a plurality of motion vectors of the optimal mode using a Lagrange cost function.

17. The computing device of claim 16, wherein the Lagrange multiplier indicates a slope of a rate-distortion curve.

18. The computing device of claim 16, wherein the quantization parameter corresponds to one of a plurality of quantization steps supported in H.264 encoding technique.

19. The computing device of claim 17, wherein the motion description is stored as user data associated with a data stream.

20. The computing device of claim 17, wherein the plurality of motion vectors are associated with the Lagrange multiplier.

* * * * *